(12) United States Patent
Bauer et al.

(10) Patent No.: US 11,370,350 B2
(45) Date of Patent: Jun. 28, 2022

(54) COMPONENT ARRANGEMENT

(71) Applicant: Dr. Ing. h.c. F. Porsche Aktiengesellschaft, Stuttgart (DE)

(72) Inventors: Riccardo Bauer, Owen (DE); Tobias Posch, Wimsheim (DE); Ulrich Koenigs, Ditzingen (DE); Andreas Kieschke, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/441,016

(22) Filed: Jun. 14, 2019

(65) Prior Publication Data

US 2019/0381931 A1 Dec. 19, 2019

(30) Foreign Application Priority Data

Jun. 18, 2018 (DE) .................. 10 2018 114 496.2

(51) Int. Cl.
| | | |
|---|---|---|
| *B60Q 1/00* | (2006.01) | |
| *B62D 35/00* | (2006.01) | |
| *B60Q 1/44* | (2006.01) | |
| *B62D 29/04* | (2006.01) | |
| *B29C 65/56* | (2006.01) | |
| *B29C 65/00* | (2006.01) | |
| *B29L 31/30* | (2006.01) | |

(52) U.S. Cl.
CPC ............ *B60Q 1/0017* (2013.01); *B29C 65/56* (2013.01); *B29C 66/022* (2013.01); *B29C 66/71* (2013.01); *B29C 66/721* (2013.01); *B60Q 1/44* (2013.01); *B62D 29/04* (2013.01); *B62D 35/007* (2013.01); *B29L 2031/30* (2013.01)

(58) Field of Classification Search
CPC ...... B60Q 1/0017; B60Q 1/44; B62D 35/007; B62D 29/04; B29C 66/71; B29C 66/721; B29C 66/022; B29C 65/56; B29L 2031/30
See application file for complete search history.

(56) References Cited

U.S. PATENT DOCUMENTS

| | | | |
|---|---|---|---|
| 5,410,455 A | 4/1995 | Hashimoto | |
| 5,709,453 A * | 1/1998 | Krent ................ | B60Q 1/0011 362/496 |
| 9,469,354 B1 | 10/2016 | Ciccone | |

FOREIGN PATENT DOCUMENTS

| | | |
|---|---|---|
| CN | 2848632 Y | 12/2006 |
| DE | 102007023474 A1 | 11/2008 |
| DE | 102007035496 A1 | 1/2009 |
| DE | 102015201358 A1 | 7/2016 |
| DE | 202016103282 U1 | 9/2016 |
| DE | 102016201382 B3 | 6/2017 |
| EP | 1849659 A1 | 10/2007 |
| JP | 05105140 A | 4/1993 |
| JP | 05229460 A * | 9/1993 |
| JP | 05229460 A | 9/1993 |

* cited by examiner

*Primary Examiner* — D Glenn Dayoan
*Assistant Examiner* — Melissa Ann Bonifazi
(74) *Attorney, Agent, or Firm* — Leydig, Voit & Mayer, Ltd.

(57) ABSTRACT

A component arrangement includes at least one basic component in which at least one additional component is integrated, the additional component forming at least one visible joint with the basic component. A holding device for the additional component is integrated in the basic component.

15 Claims, 2 Drawing Sheets

COMPONENT ARRANGEMENT

CROSS-REFERENCE TO PRIOR APPLICATIONS

Priority is claimed to German Patent Application No. DE 10 2018 114 496.2, filed on Jun. 6, 2018, the entire disclosure of which is hereby incorporated by reference herein.

FIELD

The invention relates to a component arrangement with at least one basic component in which at least one additional component is integrated, the additional component forming at least one visible joint with the basic component.

BACKGROUND

German laid-open application DE 10 2007 023 474 A1 discloses a method for producing a molded part having integrated electrostatic flat-surface loudspeakers, including the following method steps: producing a blank, which serves as a support, from plastic by means of a mold, where at least one spacer element which corresponds at least to the dimensions of the electrostatic flat-surface loudspeaker is inserted into the mold; removing the spacer element from the blank; inserting the electrostatic flat-surface loudspeaker into the recess produced in the blank by removal of the spacer element; pressing the blank having the electrostatic flat-surface loudspeaker together with a knitted fabric. European laid-open application EP 1 849 659 A1 discloses a method for a vehicle interior trim, wherein a cable is completely insert-molded with a molding compound and then a region of the molding compound is removed for the contact connection of the conductors of the cable. German laid-open specification DE 10 2015 201 358 A1 discloses a light arrangement for a rear spoiler, wherein the light is fastened to the rear spoiler via a retaining device formed integrally with the rear spoiler. German laid-open application DE 10 2007 035 496 A1 discloses a retaining device for accommodating a motor vehicle light on a motor vehicle body.

SUMMARY

An embodiment of the present invention provides a component arrangement that includes at least one basic component in which at least one additional component is integrated, the additional component forming at least one visible joint with the basic component. A holding device for the additional component is integrated in the basic component.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
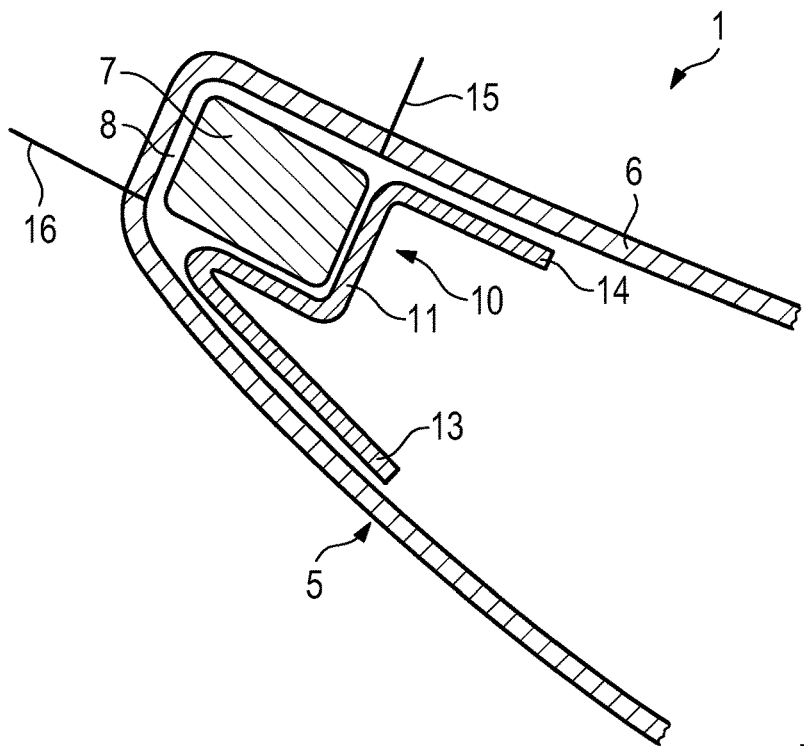
FIG. 1 shows a component arrangement with a basic component which is combined with a holding device which has a holder, in section.

Embodiments of the present invention simplify the production, in particular installation, of a component arrangement with at least one basic component in which at least one additional component is integrated, the component forming at least one visible joint with the basic component, in particular in respect of the outlay on installation and/or the joint pattern.

An embodiment of the present invention includes a component arrangement with at least one basic component in which at least one additional component is integrated, the additional component forming at least one visible joint with the basic component in that a holding device for the additional component is integrated in the basic component. The word integrated means with reference to the holding device and the basic component in particular that the holding device is already combined with the basic component during the production of the basic component. The combining of the basic component with the holding device can be realized in terms of manufacturing, for example, by the holding device being connected to the basic component by primary forming. During primary forming, for example, a casting method, in particular an injection molding method, is used in order to combine the holding device and the basic component with each other. The basic component and the holding device can be designed, for example, as sheet metal parts. However, the basic component and/or the holding device can also be formed from a plastics material, in particular from a fiber-reinforced plastics material.

A preferred exemplary embodiment of the component arrangement is characterized in that the basic component is formed from a fiber composite material. The fiber composite material is, for example, a plastics matrix in which reinforcing fibers, in particular carbon fibers or glass fibers, are embedded.

A further preferred exemplary embodiment of the component arrangement is characterized in that the holding device is formed from a plastics material, in particular from the same, preferably fiber-reinforced, plastics material as the basic component. The production and the installation of the component arrangement are thereby considerably simplified.

A further preferred exemplary embodiment of the component arrangement is characterized in that the holding device has at least one holder which is laminated together with the basic component. During the laminating, reinforcing fibers, such as glass fibers or carbon fibers, for example in the form of fiber mats, are embedded in a plastics matrix which, preferably under the action of heat, cures in order to produce a very lightweight and extremely stable component. The combining of the holder with the basic component during the laminating supplies, inter alia, the advantage that an extremely stable connection is provided between the holder and the basic component. Furthermore, an additional installation step, with which conventional holders are adhesively bonded, for example, to the basic component, can be omitted.

A further preferred exemplary embodiment of the component arrangement is characterized in that the holding device has at least two holders which are laminated together with the basic component and constitute holding receptacles for a holding body. The holding body is a separate holding element of the holding device. The holding body has, for example, holding limbs, with which the holding body is simply plugged and/or clamped into the holding receptacles of the holding device during installation.

A further preferred exemplary embodiment of the component arrangement is characterized in that the basic component is a rear wing of a motor vehicle, where the additional component is an additional rear brake light. The additional rear brake light can be fastened to the basic component with the holding device in a simple manner stably and in a visually attractive form, in particular in respect of the joint pattern between the additional component and the basic component.

Embodiments of the present invention furthermore relate to a basic component, to an additional component and/or to a holding device, in particular to a holding body, for a previously described component arrangement. The parts mentioned can be handled separately.

In a method for producing, in particular installing, a previously described component arrangement, the above-indicated advantages is alternatively or additionally achieved in that a spacer body is arranged with the holding device in a cavity of the basic component, in particular is laminated therein. During the laminating, both the at least one holder of the holding device and the spacer body are thus advantageously combined with the basic component in the component arrangement. The laminating can be carried out advantageously and at least partially in an automated manner, in particular in the case of relatively large piece numbers.

A preferred exemplary embodiment of the method is characterized in that the cavity is opened before the spacer body is removed in order to expose a receiving space in the basic component, in which receiving space the additional component is placed instead of the spacer body and fastened to the holding device. The additional component can thus be integrated in the basic component in a simple manner stably and visually perfectly. The opening of the cavity is carried out, for example, using a machining process, such as milling.

A further preferred exemplary embodiment of the method is characterized in that at least one supporting surface on the holding device is referenced and machined if required before the additional component is fastened to the holding device. The supporting surfaces are provided, for example, on coordinating bodies of the holding device. The coordinating bodies can be entirely or partially abraded when required, for example with the aid of a machining method, such as milling, in order to compensate for tolerances of the basic component, the holding device and/or the additional component.

Further advantages, features and details of the invention emerge from the description below in which various exemplary embodiments are described in detail with reference to the drawings.

Figure 2:
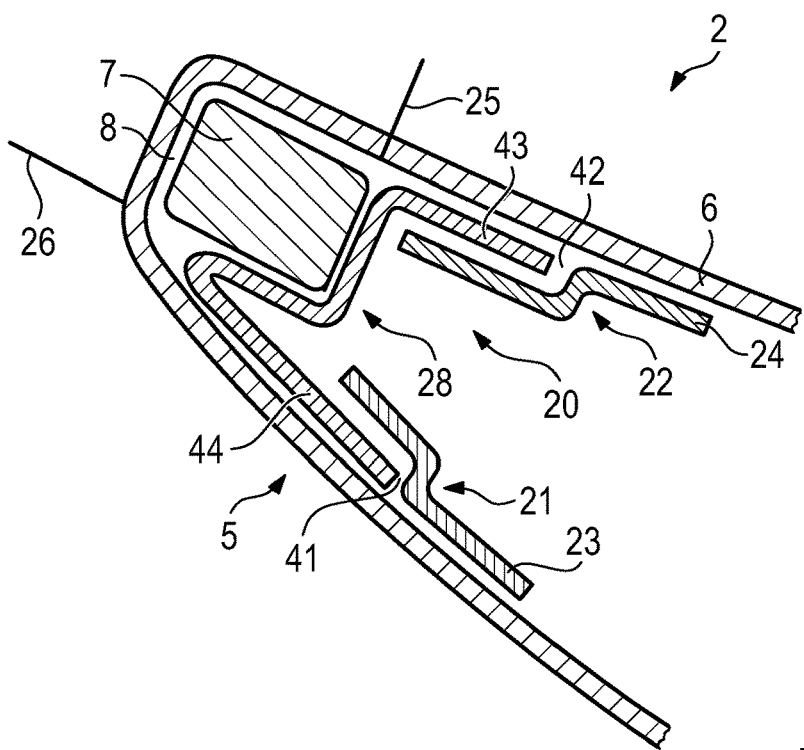
FIG. 2 shows a similar component arrangement as in FIG. 1, wherein the holding device has two holders and a holding body, in section.

FIGS. 1 and 2 both illustrate an exemplary embodiment of a component arrangement 1; 2 with a basic component 5, in section. The basic component 5 is a rear wing 6 at the rear of a motor vehicle.

Figure 3:
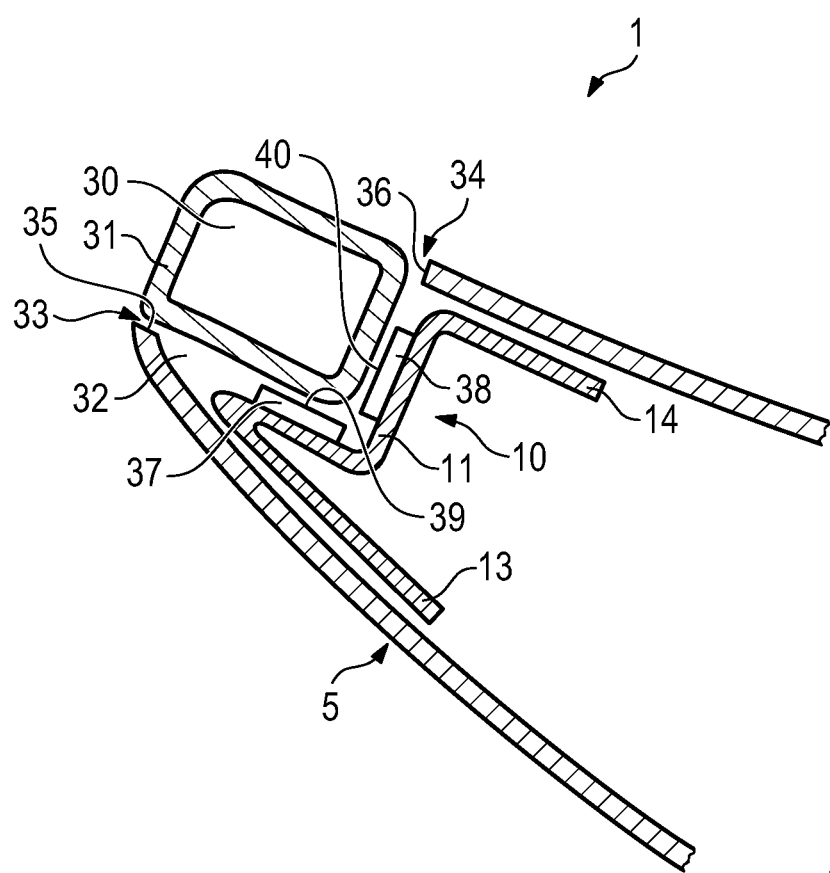
FIG. 3 shows the component arrangement from FIG. 1 after the opening of a cavity and the removal of a spacer body from the cavity, with an additional component which is fastened to the holding device, in section.

FIG. 3 illustrates the component arrangement 1 from FIG. 1 with an additional component 30, which is integrated in the basic component 5, in section. The additional component 30 is an additional rear brake light 31 which is attached in raised form to the rear wing 6.

In FIGS. 1 and 2, a spacer body 7 is arranged in the basic component 5. The spacer body 7 is arranged in a cavity 8 which is delimited in the basic component 5 by a holding device 10; 20.

The holding device 10 in FIG. 1 includes a holder 11, which is fastened to the basic component 5 by two fastening limbs 13, 14. The holder 11 is connected to the basic component 5 advantageously by laminating.

During the laminating, the holder 11 is positioned in the basic component 5 by means of the spacer body 7. The holder 11 is subsequently exposed by milling of the basic component 5, as indicated by lines 15, 16 in FIG. 1. The spacer body 7 can then be removed and the additional component (30 in FIG. 3) inserted.

The holder 11 is advantageously formed from the same or a similar material as the basic component 5 and is laminated together with the basic component 5 advantageously in one working step.

The holding device 20 illustrated in FIG. 2 includes two holders 21, 22 and a holding body 28. The holding body 28 of the holding device 20 is formed from a different material than the basic component 5. The holding body 28 is a separate component which is fastened to the basic component with the aid of the holders 21, 22 of the holding device 20.

The holders 21, 22 each have a fastening limb 23, 24 with which the holders 21, 22 are fastened to the basic component 5. The holders 21, 22 are laminated together with the basic component 5 advantageously in one working step. In the process, the holding body 28 is advantageously placed into the basic component before the laminating and positioned with the aid of the spacer body 7 during the laminating therein.

At its ends, the holding body 28 has holding limbs 43, 44 which are plugged and/or clamped in holding receptacles 41, 42. The holding receptacles 41, 42 are delimited on the basic component 5 by the holders 21, 22.

Above, in connection with FIG. 2, is described how and where the basic component 5 is machined, in particular by milling, in order to expose the spacer body 7. After the milling, the spacer body 7 can then be removed.

In FIG. 3, the milled component 5 is illustrated after removal of the spacer body (7 in FIG. 1) and insertion of the additional component 30 into a retaining space 32. Joints 33 and 34 are formed between the additional component 30 and the basic component 5. The joints 33, 34 are delimited on the basic component 5 by milling edges 35, 36.

In contrast to FIG. 1, it is seen in FIG. 3 that coordinating bodies 37, 38 can be formed on the holder 11 of the holding device 10. The coordinating bodies 37, 38 each have a supporting surface 40, 39 for the additional component 30.

The coordinating bodies 37, 38 can, for example, be machined on the supporting surfaces 40, 39, in particular by milling, in order to compensate for component tolerances and to optimize the joint pattern of the joints 33, 34.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A component arrangement, the component arrangement comprising at least one basic component in which at least one additional component is integrated, the additional component forming at least one visible joint with the basic component, wherein a holding device for the additional component is integrated in the basic component,
   wherein the holding device comprises at least one holder which is laminated together with the basic component.

2. The component arrangement as claimed in claim 1, wherein the basic component is formed from a fiber composite material.

3. The component arrangement as claimed in claim 1, wherein the holding device is formed from a plastics material.

4. The component arrangement as claimed in claim 1, wherein the holding device comprises at least two holders which are laminated together with the basic component and constitute holding receptacles for a holding body.

5. The component arrangement as claimed in claim 1, wherein the basic component is a rear wing of a motor vehicle, wherein the additional component is an rear brake light.

6. A method for producing a component arrangement, the component arrangement comprising at least one basic component in which at least one additional component is integrated, the additional component forming at least one visible joint with the basic component, wherein a holding device for the additional component is integrated in the basic component, wherein a spacer body is arranged with the holding device in a cavity of the basic component.

7. The method as claimed in claim 6, wherein the cavity is opened before the spacer body is removed in order to expose a receiving space in the basic component, in which receiving space the additional component is placed instead of the spacer body and fastened to the holding device.

8. The method as claimed in claim 6, wherein at least one supporting surface on the holding device is referenced and machined if required before the additional component is fastened to the holding device.

9. The component arrangement as claimed in claim 3, wherein the holding device is formed from the same plastics material as the basic component.

10. The method as claimed in claim 6, wherein the spacer body is laminated with the holding device in the cavity of the basic component.

11. The method as claimed in claim 8, wherein the holding device comprises at least one coordinating body and the at least one supporting surface is provided on the at least one coordinating body.

12. The method as claimed in claim 7, wherein the cavity is opened using a machining process, wherein the machining process is a milling process.

13. The method as claimed in claim 10, wherein the holding device comprises a holding body that is placed into the basic component prior to the spacer body being laminated with the holding device.

14. The method as claimed in claim 13, wherein the holding body is formed from a different material than the basic component.

15. A component arrangement, the component arrangement comprising at least one basic component in which at least one additional component is integrated, the additional component forming at least one visible joint with the basic component, wherein a holding device for the additional component is integrated in the basic component,
   wherein the holding device comprises at least one holder which is laminated together with the basic component,
   wherein the holding device comprises at least two holders which are laminated together with the basic component and constitute holding receptacles for a holding body, and wherein the holding body is formed from a different material than the basic component.

* * * * *